March 7, 1933.  F. G. BAUM  1,900,689
AIRPLANE
Filed March 6, 1930   2 Sheets-Sheet 1
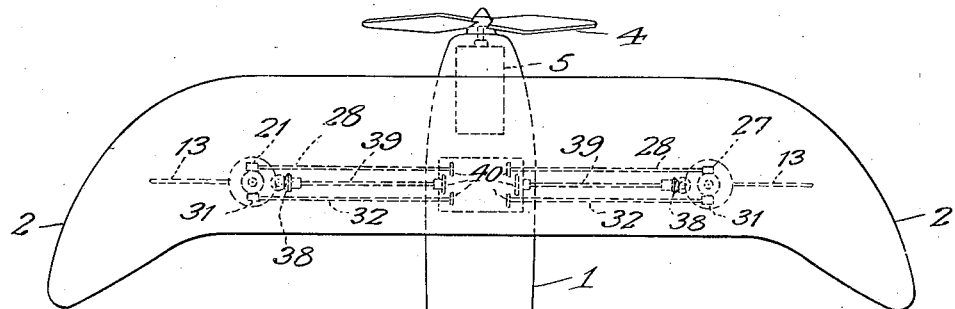
Fig. 1.
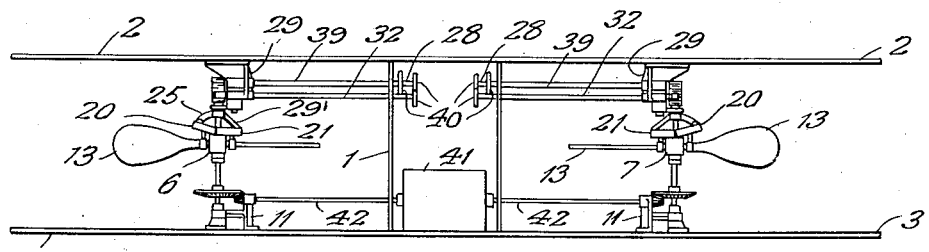
Fig. 2.
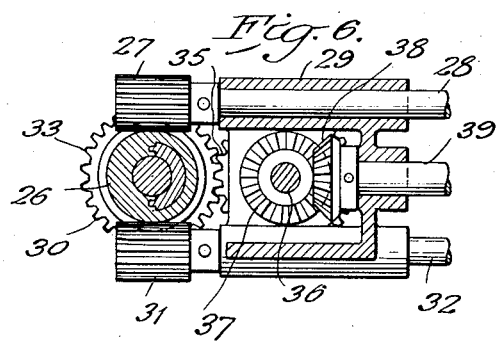
Fig. 6.  Fig. 7.
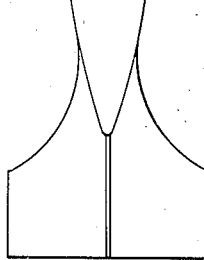
Fig. 8.
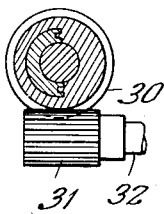
INVENTOR
FRANK G. BAUM.
BY
Victor D Borst
ATTORNEY March 7, 1933.   F. G. BAUM   1,900,689
AIRPLANE
Filed March 6, 1930   2 Sheets-Sheet 2
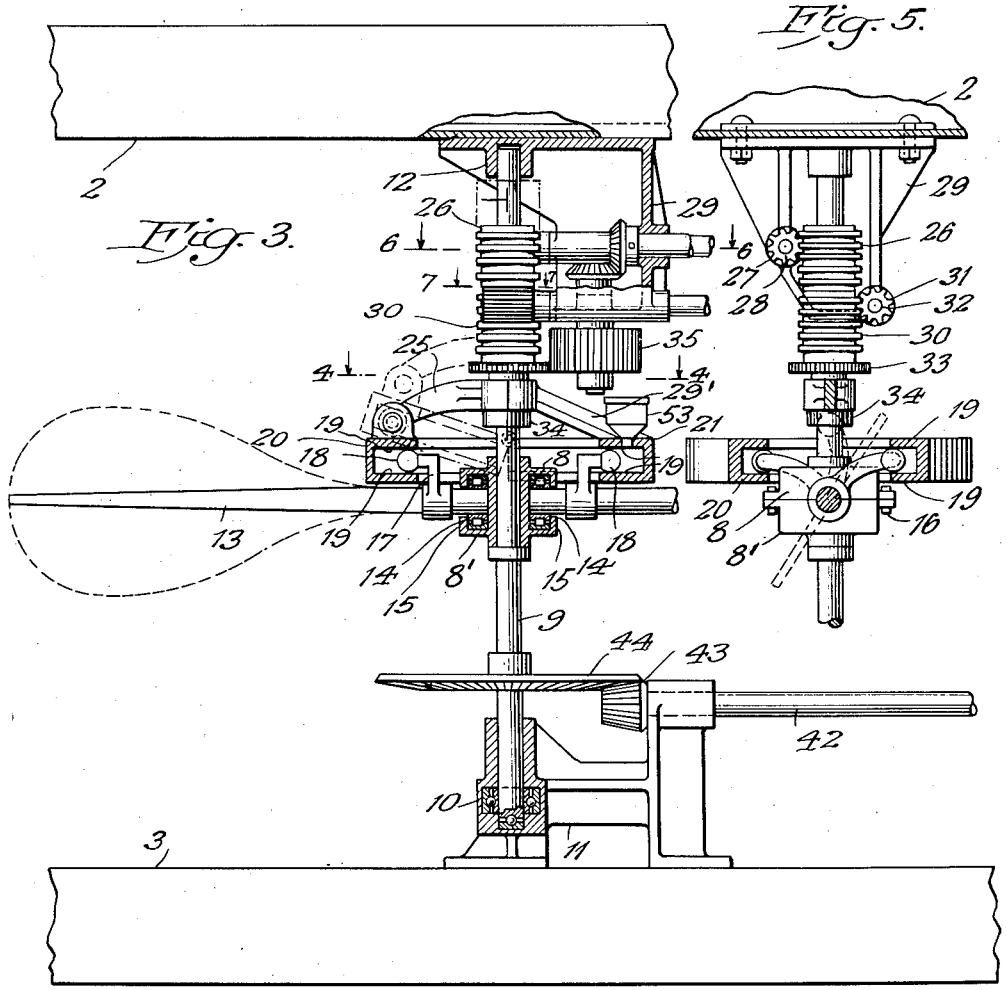
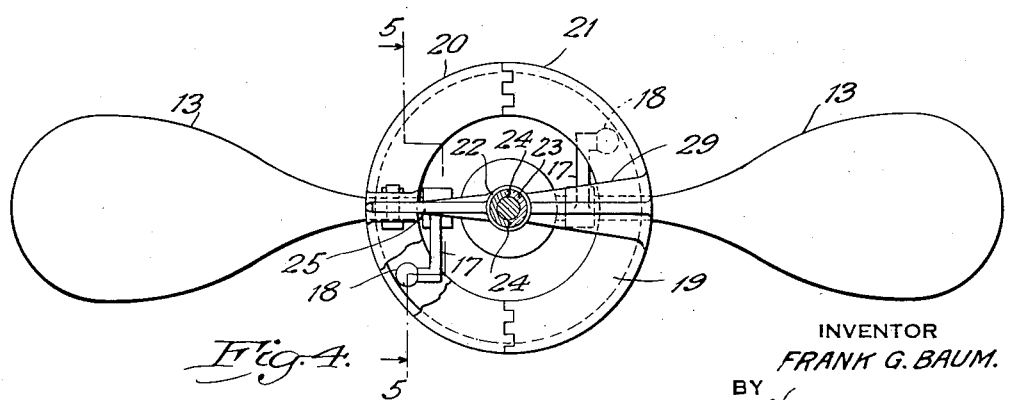
INVENTOR
FRANK G. BAUM.
BY
ATTORNEY Patented Mar. 7, 1933

1,900,689

UNITED STATES PATENT OFFICE

FRANK G. BAUM, OF SAN FRANCISCO, CALIFORNIA

AIRPLANE

Application filed March 6, 1930. Serial No. 433,556.

My invention relates to airplanes. In particular, the invention comprehends an airplane having a propeller adapted to exert a lifting force acting at right angles to the plane of the airplane and a propelling force acting parallel to the plane of the airplane.

In the construction of airplanes, it has been the more common practice to equip the airplane with a propeller adapted to exert a propelling force only and to derive the entire lifting force from the action of the surrounding air upon the wings of the airplane resulting from the motion of the airplane relative to the air. In such constructions, the speed of the airplane with respect to the surrounding air must be comparatively high to keep the airplane aloft, and in consequence thereof, the airplane must be brought to a high rate of speed in order to take off and must be landed while moving at a high rate of speed. Attempts have been made to overcome these difficulties and to increase the stability of the airplane during flight. Such attempts have usually resulted in constructing the airplane to act as a helicopter at take off and landing by equipping the airplane with a vertical lifting propeller. However, the force required to lift the weight of the airplane vertically is such that the vertical lifting propeller is necessarily large and cumbersome and greatly increases the parasitic drag of the airplane.

By my invention I am enabled to decrease the take off and landing speeds of an airplane without materially affecting the parasitic drag of the airplane. I employ a construction in which the lifting propellers have a feathering action so that they exert both a lifting and a propelling force.

A feature of my invention is the fact that the feathering action of the propeller may be controlled to vary the magnitude of the lifting force exerted by the propellers.

Another feature of my invention is the fact that the feathering action of the propellers may be controlled to vary the magnitude and direction of application of the propelling force exerted by the propellers.

Specifically, I employ in combination with the fuselage, wings and forward driving propellers, one or more additional propellers, the plane of rotation of which is substantially parallel to the plane of the wings. The additional propellers comprise a plurality of blades mounted in a hub for oscillation about their longitudinal axis. Each propeller blade is provided with a cam follower which engages a cam and cooperates therewith to oscillate the propeller blades from a position at an angle to the plane of rotation of the propeller during one half of each revolution of the propeller to a position parallel to the plane of rotation of the propeller during the other half of each revolution of the propeller, thereby imparting a feathering action to the propeller blades. The relation of the cam to the cam follower may be varied to increase or decrease the angle which the propeller blade makes with the plane of rotation of the propeller so as to vary the magnitude of the lifting and propelling force exerted thereby, and the cam may be rotated about the propeller shaft to vary the angular position of the propeller blades, in the rotation of the propeller, at which the propeller blades are oscillated to control the direction of action of the propelling force. The relation of the cam to the cam followers may also be varied to cause the propellers to act solely as lifting propellers and also to be ineffective although rotated.

Other features and advantages of my invention will hereinafter appear from the following particular description of one embodiment thereof taken in connection with the accompanying drawings in which:

Fig. 1 is a plan of an airplane embodying my invention;

Fig. 2 is a sectional elevation of the same taken on the line 2—2 of Figure 1;

Fig. 3 is an enlarged fragmentary sectional elevation of one side of the airplane shown in Figure 1, and illustrates the control mechanism for the horizontal propellers;

Fig. 4 is a section taken on line 4—4 of Figure 3 and having parts broken away;

Fig. 5 is a section taken through the irregular line 5—5 of Figure 4;

Fig. 6 is an enlarged transverse section of the horizontal propeller shaft and associated mechanism taken on the line 6—6 of Figure 3, Fig. 7 is a detail transverse section similar to Figure 6 taken on the line 7—7 of Figure 3, and Figure 8 is a fragmentary longitudinal section of a control and drive shaft.

In the drawings, I have illustrated my invention as embodied in an airplane of the type commonly known as a biplane. It is, however, to be understood that the invention is not limited to any particular type of airplane. The airplane shown comprises the usual fuselage 1, upper and lower wings 2 and 3 extending from the fuselage on either side thereof and a draw propeller 4 which is driven by a motor 5 to which it is directly connected. Between the upper and lower wings 2 and 3 on either side of the fuselage 1, there are additional propellers 6 and 7, the plane of rotation of which is substantially parallel to the plane of the wings. These propellers 6 and 7 are adapted to exert both a lifting and propelling force on the airplane. The lifting force exerted by the propellers 6 and 7 supplements the lifting force derived from the action of the surrounding air on the wings when the airplane is moved relative to the air by the action of the draw propeller 1. This additional lifting force exerted by the propellers 6 and 7 permits the airplane to take off and land at comparatively low speeds. The propellers 6 and 7 also exert a propelling force which acts to move the airplane within its own plane. The magnitude of the lifting and propelling forces, and the direction of application of the propelling force may be varied by the pilot to control the movements of the airplane as will hereinafter appear.

The propellers 6 and 7 are identical in all respects and for that reason only one has been shown in detail. The hub of the propeller which is made in two parts 8 and 8' is secured to the propeller shaft 9 which is perpendicular to the plane of the wings 2 and 3 and is journaled at one end in a thrust bearing 10 formed in a bearing bracket 11 secured to the lower wing 3. At the other end, the shaft 9 is journaled in a bearing bracket 12 secured to the upper wing 2. The propeller comprises a plurality of propeller blades 13, of any desired shape or form, (shown as two) extending at right angles to the axis of the propeller shaft 9. The propeller blades are provided with internal thrust collars 14 which are journaled between the parts 8 and 8' of the hub for oscillation about the longitudinal axis of the propeller blade. The parts 8 and 8' of the hub are each provided with an inturned circumferential flange 15 which, when the parts are secured together by bolts 16, abut against the shoulder formed by the thrust collar 14 to resist the centrifugal force created by the rotation of the propeller blades. Each of the propeller blades has secured thereto, adjacent the hub, a crank lever 17 on the crank end of which there is journaled a cam roller 18. The cam roller 18 is adapted to be inserted between and engaged by the inner surfaces of flanges 19 formed on a cam ring.

The cam ring comprises two identical semi-circular parts 20 and 21 which are pivotally secured together to form a continuous ring concentric with the propeller shaft. The cam ring is substantially U-shape in cross-section, the flanges 19 thereof, between which the cam roller 18 on the crank lever 17 act, extending radially inwardly. The cam ring is supported immediately above the hub of the propeller by a hollow control shaft journaled on the propeller shaft 9 and supported thereby in such a position that when both halves of the cam ring lie in the same plane, the relation of the cams to the crank levers 17 on the propeller blades is such that the plane of the propeller blades will be substantially parallel to the plane of rotation of the propeller, in other words, the pitch of the propeller blades will be zero and the propeller will be, although rotated, ineffective.

The hollow control shaft supporting the cam ring is divided longitudinally thereof into two parts 22 and 23 which are relatively movable longitudinally of the axis of the shaft and are secured together against relative rotational movement by tongue and groove connections 24. The part 22 of the control shaft is secured to the part 20 of the cam ring through a bracket arm 25 which is rigidly secured to the lower end of the part 22 of the shaft and pivotally secured to the part 20 of the cam ring. On the upper end of the part 22 of the control shaft, there is formed a rack 26 having circumferential teeth which extend around the part 23 so that a pinion 27 is always in engagement with the rack irrespective of any rotational movement of the shaft. The pinion 27 is secured on a shaft 28 journaled at one end in a bearing bracket 29 secured to the upper wing 2 and extends at the other end into the fuselage 1 in which it is journaled. Through the train of gears just described rotation of the shaft 28 within the fuselage 1 will move the part 22 of the control shaft supporting the part 20 of the cam ring longitudinally of the axis of the shaft. Longitudinal movement of the part 22 of the control shaft will move the part 20 of the cam ring about the pivotal connection between the two parts of the cam ring to some such position as shown by the broken lines in Figure 3. Movement of the part 20 of the cam ring to the position shown by the broken lines changes the relation between this half of the cam ring and the crank levers 17 on the propeller blades so that, as the cam roller 18 enters this half of the cam ring, the propeller blade is rotated to a position in which the plane of the blade is at an angle to the plane of rotation of the propeller as shown in broken lines in Figure 3, and as the cam roller 18 leaves this half of the cam ring, the propeller blade is returned to its original position. Thus, the propeller blades are given a feathering action such that they act during only one half of each revolution of the propeller and in only one direction, thereby in addition to creating a lifting force, they create an unbalanced propelling force, that is, a force acting in the plane of the airplane. It is, of course, understood that the part 20 of the cam ring may be set at any position intermediate the limits of its movement so that the magnitude of the forces exerted by the propeller may be varied at the will of the pilot while the driving motor is running at a constant speed.

The part 23 of the control shaft is secured to the part 21 of the cam ring by a bracket arm 29' which is rigidly secured to the lower end of the part 23 of the two part shaft and the part 21 of the cam ring. The part 23 of the control shaft has formed thereon, immediately below the circumferential rack 26 on the part 22 of the control shaft, a circumferential rack 30 which is similar to the rack 26 and encircles the part 22 of the shaft. A pinion 31 secured on a shaft 32 engages the rack 30. The shaft 32 is journaled in the bearing bracket 29 at one end and extends at the other end into the fuselage 1 in which it is journaled. By means of this train of gears, rotation of the shaft 32 within the fuselage 1 will move the part 23 of the control shaft longitudinally of the axis of the control shaft. Upward longitudinal movement of the part 23 of the control shaft will cause upward movement of the part 22 by virtue of the upper end of the circumferential rack 30 abutting against the lower end of the circumferential rack 26 on the part 22 of the shaft. Thus, upward longitudinal movement of the part 23 of the control shaft raises the cam ring as a unit, thereby rotating all the propeller blades about their axis and causing the propeller to act solely as a lifting propeller, the pitch of the blades being determined by the distance the cam ring is lifted.

Immediately below the circumferential rack 30 formed on the part 23 there is secured to the part 23 a spur gear 33 which encircles the part 22 of the shaft. The spur gear 33 on the part 23 and the circumferential racks 26 and 30 serve to clamp the two parts of the shaft together. The two part shaft, in its normal position, abuts at its lower end against a collar 34 secured to the shaft 9. The collar 34 also serves to limit the downward longitudinal movement of the two part shaft. The spur gear 33 formed on the part 23 of the control shaft meshes with a spur gear 35 secured to a stub shaft 36 which is journaled in the bearing bracket 29. A bevel gear 37 is also secured on the stub shaft 36 and meshes with a bevel gear 38 secured on a shaft 39 which is journaled at one end in the bearing bracket 29 and extends along the wing into the fuselage 1 of the airplane. By virtue of this connection of the shaft 39 with the spur gear 33 on the part 23 of the control shaft, through the gear train just described, rotation of the shaft 39 from within the fuselage 1 is transmitted to the control shaft. Rotation of the control shaft rotates the cam ring to vary the angular position in the rotation of the propeller at which the propeller blades are oscillated and thereby changes the direction of application of the propelling force exerted by the propeller. In this manner, the angular position at which the blades are oscillated may be varied to change the direction of movement of the airplane and by a half revolution of the ring from the position illustrated, to apply the propelling force in a direction opposite to the movement of the airplane to effect a braking or retarding action.

Within the fuselage, the shafts 28, 32 and 39 through which the action of the propellers 6 and 7 is controlled are shown as being provided with separate manipulating hand wheels 40, that is, there are six manipulating handles, one for each of the two shafts 28, one for each of the two shafts 32, and one for each of the two shafts 39. This arrangement provides greater control for stabilizing the airplane during flight. However, the two shafts 28 may be connected together and a single manipulating hand wheel provided therefor. Likewise, the two shafts 32 and the two shafts 39 may be connected together and operated by a single hand wheel.

The two propellers are driven in opposite directions of rotation by a common motor 41 to each end of which there is connected a drive shaft 42. The drive shafts 42 extend along the lower wings and are journaled in the bearing brackets 11 in which the lower end of the propeller shafts 9 are journaled. On the end of the drive shafts 42 there is secured a bevel gear 43 which meshes with beveled ring gears 44 secured to the propeller shafts 9.

The active surfaces of the cam rings may be lubricated by a lubricating cup 53 or any other suitable means.

In starting and landing, the auxiliary propellers may be utilized as follows: While the motor 41 is idling before take off, the part 20 of the cam ring would be positioned as shown in full lines in Figure 3 so that the propellers 6 and 7 are ineffective. On starting, the pilot manipulates the hand wheels secured to the ends of the shafts 28 or 32 within the fuselage to raise the cam ring as a unit thereby causing the propellers to act solely as lifting propellers or to raise the part 20 of the cam ring thereby imparting a feathering action to the propeller blades. The pilot's selection will depend upon the lifting force desired. In either case the lifting force exerted by the propellers acts in conjunction with the lifting force exerted by the relative movement of the air as the airplane moves over the ground. If the shaft 28 is rotated, the propellers 6 and 7 will also exert a propelling force which acts in conjunction with the force exerted by the draw propeller. The combined lifting forces exerted by the propellers 6 and 7 and the action of the surrounding air upon the wings of the airplane is sufficient to lift the airplane while is is traveling at a comparatively low rate of speed. As the airplane gains altitude, the parts 20 of the cam rings may be raised to the upper limit of their movement and the parts 21 lowered so that the lifting force exerted by the propellers becomes practically negligible and the propellers exert their maximum propelling force in the direction of travel of the airplane. During flight, the cam rings may be rotated to change the direction of application of the propelling force and thereby change the direction of travel of the airplane. The cam rings may also be adjusted to stabilize the airplane in uncertain weather and to prevent drifting, these adjustments, of course, depending upon the prevailing conditions. As the airplane approaches the landing field of its destination, the parts 20 of the cam rings may be adjusted to cause the propellers 6 and 7 to again exert a lifting force and when approaching the ground, the cam ring may be rotated so that the propelling force is exerted in a direction opposite to the direction of motion of the plane, thereby creating a braking effect and slowing down the plane before it touches the earth.

It is clear that the propellers may be mounted in any desirable position. They may be mounted as shown, or be mounted in the wings of the plane, so as to form really a part of the wing, or they may be mounted above or below the wings. The same engine that drives the forward propeller may be used to drive the two horizontal propellers.

It is obvious that various changes may be made in the embodiment illustrated in the drawings and above particularly described within the the principle and scope of my invention as expressed in the appended claims.

I claim:

1. In an airplane, in combination, a propeller adapted to exert a lifting and a propelling force comprising a hub, a plurality of propeller blades mounted in the hub to oscillate about their longitudinal axes, means for oscillating the propeller blades to impart a feathering action thereto to render the blades successively ineffective during substantially one half of each rotation of the propeller, means for varying the angle through which the blades are oscillated from the ineffective position and means for rotating the propeller.

2. In an airplane, in combination, a propeller adapted to exert a lifting and a propelling force comprising a hub, a plurality of propeller blades mounted in the hub to oscillate about their longitudinal axes, means for oscillating the propeller blades to impart a feathering action thereto to render the blades successively ineffective during one half of each rotation of the propeller, means for rotating the propeller, and means controlling the feathering action of the propeller blades for varying the direction of application of the propelling force exerted on the airplane by the propeller blades.

3. In an airplane, in combination, a propeller adapted to exert a lifting and a propelling force comprising a hub, a plurality of propeller blades mounted in the hub to oscillate about their longitudinal axes, means for oscillating the propeller blades to impart a feathering action thereto to render the blades successively ineffective during one half of each rotation of the propeller, means for controlling the feathering action of the propeller blades to vary the magnitude of the lifting force exerted by the propeller, and means for rotating the propeller.

4. In an airplane, in combination, a propeller adapted to exert a lifting and a propelling force comprising a hub, a plurality of propeller blades mounted in the hub to oscillate about their longitudinal axes, means for oscillating the propeller blades to impart a feathering action thereto to render the blades successively ineffective during one half of each rotation of the propeller, means for rotating the propeller, means for controlling the feathering action of the propeller blades to vary the magnitude of the lifting force exerted by the propeller, and additional means for controlling the feathering action of the blades to vary the direction of application of the propelling force exerted on the airplane.

5. In an airplane, in combination with the fuselage and the wings, a propeller adapted to exert a lifting and propelling force, the plane of rotation of which is substantially parallel to the plane of the wings, the propeller comprising a hub and a plurality of propeller blades mounted in the hub for oscillation about their longitudinal axes, cam followers on the propeller blades adjacent the hub, a cam engaging the cam followers on the propeller blades for oscillating the blades from a position at an angle to the plane of rotation of the propeller during substantially one half of each revolution thereof to a position parallel to the plane of rotation of the propeller during the other half of each revolution thereof, means for varying the cam to change the angle through which the blades are oscillated from their ineffective position and means for rotating the propeller.

6. In an airplane, in combination with the fuselage and the wings, a propeller adapted to exert a lifting and propelling force, the plane of rotation of which is substantially parallel to the plane of the wings, the propeller comprising a hub and a plurality of propeller blades mounted in the hub for oscillation about their longitudinal axes, cam followers on the propeller blades adjacent the hub, a cam engaging the cam followers on the propeller blades for oscillating the blades from a position at an angle to the plane of rotation of the propeller during substantially one half of each revolution thereof to a position parallel to the plane of rotation of the propeller during the other half of each revolution thereof, means for shifting the cam to vary the angle which the propeller blades form with the plane of rotation of the propeller, during the effective half of each rotation of the propeller and means for rotating the propeller.

7. In an airplane, in combination with the fuselage and the wings, a propeller adapted to exert a lifting and propelling force, the plane of rotation of which is substantially parallel to the plane of the wings, the propeller comprising a hub and a plurality of propeller blades mounted in the hub for oscillation about their longitudinal axes, cam followers on the propeller blades adjacent the hub, a cam engaging the cam followers on the propeller blades for oscillating the blades from a position at an angle to the plane of rotation of the propeller during substantially one half of each revolution thereof to a position parallel to the plane of rotation of the propeller during the other half of each revolution thereof, means for adjusting the cam about the axis of rotation of the propeller to vary the place in the rotation of the propeller at which the propeller blades are oscillated to a position at an angle to the plane of rotation of the propeller, and means for rotating the propeller.

8. In an airplane, in combination with the fuselage and the wings, a propeller adapted to exert a lifting and propelling force, the plane of rotation of which is substantially parallel to the plane of the wings, the propeller comprising a hub and a plurality of propeller blades mounted in the hub for oscillation about their longitudinal axes, cam followers on the propeller blades adjacent the hub, a cam engaging the cam followers on the propeller blades for oscillating the blades from a position at an angle to the plane of rotation of the propeller during one half of each revolution thereof to a position parallel to the plane of rotation of the propeller during the other half of each revolution thereof, means for adjusting the cam about the axis of the propeller to vary the place in the rotation of the propeller at which the propeller blades are oscillated to a position at an angle to the plane of rotation of the propeller, additional means for shifting the cam to vary the angle which the propeller blades form with the plane of rotation of the propeller during one half of each revolution of the propeller, and means for rotating the propeller.

9. In an airplane, in combination a propeller adapted to exert a lifting and propelling force comprising a hub, a plurality of propeller blades mounted in the hub to oscillate about their longitudinal axis, means for oscillating the propeller blades to impart a feathering action thereto to render the blades successively ineffective during substantially one half of each rotation of the propeller, means controlling the angle through which the propeller blades are oscillated from the ineffective position for varying the magnitude of the propelling force exerted by the propeller, and means for rotating the propeller.

10. In an airplane, in combination a propeller adapted to exert a lifting and propelling force comprising a hub, a plurality of propeller blades mounted in the hub to oscillate about their longitudinal axis, means for oscillating the propeller blades to impart a feathering action thereto, means controlling the feathering action of the propeller blades for varying the magnitude of the lifting and propelling forces exerted by the propeller, and means for rotating the propeller.

In witness whereof, I hereunto subscribe my signature.

FRANK G. BAUM.